US009529898B2

(12) United States Patent
Epstein et al.

(10) Patent No.: US 9,529,898 B2
(45) Date of Patent: Dec. 27, 2016

(54) CLUSTERING CLASSES IN LANGUAGE MODELING

(71) Applicant: Google Inc., Mountain View, CA (US)

(72) Inventors: Mark Edward Epstein, Katonah, NY (US); Vladislav Schogol, Brooklyn, NY (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/656,027

(22) Filed: Mar. 12, 2015

(65) Prior Publication Data

US 2016/0062985 A1 Mar. 3, 2016

Related U.S. Application Data

(60) Provisional application No. 62/042,185, filed on Aug. 26, 2014.

(51) Int. Cl.
*G06F 17/30* (2006.01)
*G06F 17/27* (2006.01)

(52) U.S. Cl.
CPC ..... *G06F 17/30707* (2013.01); *G06F 17/2715* (2013.01); *G06F 17/2775* (2013.01)

(58) Field of Classification Search
None
See application file for complete search history.

(56) References Cited

U.S. PATENT DOCUMENTS

| | | | |
|---|---|---|---|
| 5,835,893 A | 11/1998 | Ushioda | |
| 6,317,707 B1 | 11/2001 | Bangalore et al. | |
| 6,415,248 B1 | 7/2002 | Bangalore et al. | |
| 6,782,357 B1 | 8/2004 | Goodman et al. | |
| 8,135,578 B2 | 3/2012 | Hebert | |
| 8,280,719 B2 * | 10/2012 | Miller | G06F 17/278 704/9 |
| 8,504,356 B2 * | 8/2013 | Mizuguchi | G06F 17/277 704/277 |

(Continued)

FOREIGN PATENT DOCUMENTS

WO 02/082310 10/2002

OTHER PUBLICATIONS

Li et al., Text document clustering based on frequent word meaning sequences, Aug. 30, 2007, Elsevier B. V., 381-404.*

(Continued)

*Primary Examiner* — Barbara Reinier
(74) *Attorney, Agent, or Firm* — Fish & Richardson P.C.

(57) ABSTRACT

This document describes, among other things, a computer-implemented method. The method can include obtaining a plurality of text samples that each include one or more terms belonging to a first class of terms. The plurality of text samples can be classified into a plurality of groups of text samples. Each group of text samples can correspond to a different sub-class of terms. For each of the groups of text samples, a sub-class context model can be generated based on the text samples in the respective group of text samples. Particular ones of the sub-class context models that are determined to be similar can be merged to generate a hierarchical set of context models. Further, the method can include selecting particular ones of the context models and generating a class-based language model based on the selected context models.

19 Claims, 5 Drawing Sheets

(56) References Cited

U.S. PATENT DOCUMENTS

| | | | |
|---|---|---|---|
| 8,812,299 B1* | 8/2014 | Su | G06F 17/2785 |
| | | | 704/1 |
| 8,849,668 B2* | 9/2014 | Han | G10L 15/197 |
| | | | 704/235 |
| 9,367,526 B1* | 6/2016 | Vozila | G06Q 10/107 |
| 2001/0051868 A1 | 12/2001 | Witschel | |
| 2003/0069877 A1* | 4/2003 | Grefenstette | G06F 17/30643 |
| 2006/0287848 A1 | 12/2006 | Li et al. | |
| 2012/0191457 A1* | 7/2012 | Minnis | G10L 13/10 |
| | | | 704/260 |
| 2012/0265521 A1* | 10/2012 | Miller | G06F 17/278 |
| | | | 704/9 |
| 2013/0103493 A1* | 4/2013 | Gao | G06Q 10/10 |
| | | | 705/14.46 |
| 2015/0332670 A1* | 11/2015 | Akbacak | G10L 15/063 |
| | | | 704/9 |
| 2016/0085506 A1* | 3/2016 | Johnston | G06F 17/30026 |
| | | | 704/275 |
| 2016/0140104 A1* | 5/2016 | Miller | G06F 17/278 |
| | | | 704/9 |

OTHER PUBLICATIONS

Baker et al., Distributional clustering of words for text classification, SIGIR 1998, 96-103.*

Brown et al., "Class-based $n$-gram models of natural language," Computational Linguistics, 18(4):467-479, Dec. 1992.

Gao et al., "The Use of Clustering Techniques for Language Modeling—Application to Asian Languages," Computational Linguistics and Chinese Language Processing, 6(1):27-60, Feb. 2001.

* cited by examiner

CLUSTERING CLASSES IN LANGUAGE MODELING

CROSS-REFERENCE TO RELATED APPLICATIONS

This application claims priority to U.S. application Ser. No. 62/042,185, filed on Aug. 26, 2014, the entire contents of which are hereby incorporated by reference.

TECHNICAL FIELD

This document generally relates to computational linguistics.

BACKGROUND

Speech recognition has become a widely adopted and frequently used mode of interacting with computing devices. Speech input may be more convenient and efficient than traditional input modes such as typing through a keyboard. For example, mobile computing devices may offer speech recognition services as an alternative input mode to typing characters through a virtual keyboard on a touchscreen. Some computing devices are configured to accept voice commands from a user as a shortcut to performing certain actions on the computing device. Voice commands and other speech can be transcribed to text with the assistance of language models. Language models have been trained using samples of text in a language to improve accuracies of the language models.

SUMMARY

This document generally describes systems, methods, and other techniques for generating class-based language models. Class-based language models are language models that are programmed to predict probabilities of sequences of terms in which one or more of the terms belong to a class of terms on which the language model has been trained. One example of a class of terms is dates. A class-based language model may be trained to predict the probability that a particular term in a sequence of terms is a date if certain other terms in the sequence are known or assumed. For example, in the partial sentence, "Are you leaving for Sydney on ________?", a class-based language model may be called upon to predict the most likely term(s) that complete the sentence. The class-based language model may evaluate a probability that the final term is within a class of terms, DATE, and then identify a most likely date expression within the class. Class-based language models can be advantageous in that the amount of training data required to train a reliable class-based language model can be substantially reduced as compared to the amount of training required to train a language model without classes. In a non-class based language model, much greater diversity of text samples that include a broad spectrum of terms within a class can be required to adequately train the language model. For example, similar sequences of terms that have different combinations of dates, locations, numbers, or other classes may be required to adequately train a non-class based language model. On the other hand, a class-based language model can leverage the experience from a training sample that includes a particular instance of a class to apply to the class as a whole, such as, for example, by substituting the class terms in a training sample with a class identifier (e.g., $DATE), and adding the terms that were substituted out of the training sample into a grammar for the class.

Through the techniques described herein, improved class-based language models can be generated by breaking classes (which this paper refer to as "super-classes" such as dates, percentages, locations, or other classes of terms) into component sub-classes, and clustering the sub-classes into respective clustered classes that are provided in a language model. Because substantial diversity may exist in the context of how different class terms are used in a language, it can be beneficial to partition a super-class into multiple classes in a language model so as to maximize the differences in context of terms between each of the partitioned classes. For example, a conventional class-based language model may include classes that correspond to a number of class "concepts" (i.e., super-classes) such as date, time, percentages, and money classes. The performance of such class-based language models can be improved by breaking up super-classes into multiple "clustered" classes that collectively cover a complete set of terms for the super-class. Each clustered class can correspond to a particular group of class terms that are used with similar context in a language. For example, the date strings "21st of April," "13th of March," and "8th of August" may have context with similar distributions in a language (e.g., the two or three words that surround each of these date strings in text samples that are representative of how the date strings are used in the English language may be similar). Therefore, a clustered class that covers each of these date strings (and perhaps other date strings) can be provided in a language model in lieu of a date super-class. Additional clustered classes that collectively cover all of the date terms and phrases covered by the date super-class can also be provided in the language model to provide better precision in recognizing class terms. Similarly, other super-classes in the language model, such as money, percentages, and time classes, can be broken into a plurality of clustered classes in which class terms with similar context are clustered together, and class terms whose context is dissimilar are separated into different classes in the language model.

In some implementations, these techniques may enhance the ability of a language model to detect subtle differences among class terms in a sentence. For example, a language model which is built with clustered classes may better model differences between singular and plural class terms, the gender of class terms, and other variations in how class terms are used. In some implementations, the techniques described herein can be used to optimize the selection of sub-classes that are to be clustered in a class-based language model. For example, arbitrary or topic-driven clustering may not yield optimal classes in a language model (e.g., dividing dates conceptually between expressions of calendar days (July 4) and holidays (4th of July, Independence Day)). In some implementations, optimal clusters of sub-classes can be determined by generating a hierarchical set of class context models, the set including a both sub-class context models and other context models that have been successively merged from the sub-class context models based on similarities among the context models to form the hierarchy. Each merged context model corresponds to a cluster of sub-classes. Particular ones of the context models in the hierarchy can then be selected for building a class-based language model. Classes in the language model can correspond to the selected context models.

Some implementations include a computer-implemented method. The method can include obtaining a plurality of text samples that each include one or more terms belonging to a first class of terms. The plurality of text samples can be classified into a plurality of groups of text samples. Each group of text samples can correspond to a different sub-class of terms such that the one or more terms belonging to the first class of terms in the respective text samples for each group of text samples belong to the corresponding sub-class of terms for the respective group of text samples. For each of the groups of text samples, a sub-class context model can be generated based on the text samples in the respective group of text samples. Particular ones of the sub-class context models that are determined to be similar can be merged to generate a hierarchical set of context models. Further, the method can include selecting particular ones of the context models from among the hierarchical set of context models, and generating a class-based language model based on the selected context models, each of the selected context models corresponding to a respective class in the class-based language model.

These and other implementations may include one or more of the following features. At least a portion of the text samples in the plurality of text samples can be obtained from logs of natural-language search queries or from logs of speech recognition results.

The method can further include performing, using the class-based language model, at least one of machine translation, speech recognition, and optical character recognition.

The first class of terms can include dates, and the respective sub-class of terms for each group of text samples can be a particular set of one or more dates.

The one or more terms belonging to the first class of terms in a first text sample from among the plurality of text samples can indicate a date without naming any of a calendar year, a calendar month, and a calendar day.

The first class of terms can include percentages, and the respective sub-class of terms for each group of text samples can include a particular set of one or more percentage values. The first class of terms can include one of percentages, song names, currency names or values, times, city names, state names, address numbers, chapter numbers, operands, times, and geographic locations.

The method can further include determining that the particular ones of the sub-class context models are similar using a Kullback-Liebler divergence technique.

Merging the particular ones of the sub-class context models to generate the hierarchical set of context models can include adding the sub-class context models to the hierarchical set of context models; repeatedly identifying and merging two or more context models that are determined to be similar to generate an intermediate context model, wherein the two or more context models are selected from a group consisting of the sub-class context models and other intermediate context models that have previously been generated by merging context models; and adding each instance of the intermediate context model that is generated to the hierarchical set of context models.

Selecting the particular ones of the context models from among the hierarchical set of context models can include selecting multiple context models that are collectively trained based on substantially all of the text samples for which the sub-class context models were generated, wherein at least one of the multiple context models selected is an intermediate context model that was generated by merging two or more context models that were determined to be similar.

The particular ones of the context models can be selected so as to optimize one or more metrics.

The particular ones of the context models can be selected so as to optimize two or more metrics including: (i) minimizing a total number of context models selected to generate the class-based language model, and (ii) maximizing variation among the particular ones of the context models selected.

The method can further include evaluating one or more performance metrics of the class-based language model using a first set of input data.

The method can further include selecting second ones of the context models from among the hierarchical set of context models; generating a second class-based language model based on the selected second ones of the context models, each of the second ones of the context models corresponding to a class in the second class-based language model; evaluating the one or more performance metrics of the second class-based language model using the first set of input data; and determining whether the class-based language model or the second class-based language model is better based on the one or more performance metrics.

The sub-class context models can be generated by training the sub-class context models using text samples in which the one or more terms belonging to the first class of terms are redacted and replaced with a class identifier.

The sub-class context models can be generated by training the sub-class context models on truncated text samples that include only the n terms that immediately precede the one or more terms belonging to the first class of terms through the n terms that immediately follow the one or more terms belonging to the first class of terms.

The parameter n can equal two or three.

For each of the groups of text samples, the one or more terms belonging to the first class of terms for each of the text samples in the respective group of text samples can be substantially identical.

Some implementations can include one or more computer-readable media that include instructions which, when executed by one or more processors, cause operations to be performed. The operations can include: obtaining a plurality of text samples that each include one or more terms belonging to a first class of terms; classifying the plurality of text samples into a plurality of groups of text samples, each group of text samples corresponding to a different sub-class of terms such that the one or more terms belonging to the first class of terms in the respective text samples for each group of text samples belong to the corresponding sub-class of terms for the respective group of text samples; for each of the groups of text samples, generating a sub-class context model based on the text samples in the respective group of text samples; merging particular ones of the sub-class context models that are determined to be similar to generate a hierarchical set of context models; selecting particular ones of the context models from among the hierarchical set of context models; and generating a class-based language model based on the selected context models, each of the selected context models corresponding to a respective class in the class-based language model.

These and other implementations may include one or more of the following features. For each of the groups of text samples, the one or more terms belonging to the first class of terms for each of the text samples in the respective group of text samples can be substantially identical.

Some implementations can include a computer-implemented system. The system can include one or more processors, and one or more computer-readable media. The one or more computer-readable media can include instructions that, when executed by the one or more processors, cause performance of operations including obtaining a plurality of text samples that each include one or more terms belonging to a first class of terms; classifying the plurality of text samples into a plurality of groups of text samples, each group of text samples corresponding to a different sub-class of terms such that the one or more terms belonging to the first class of terms in the respective text samples for each group of text samples belong to the corresponding sub-class of terms for the respective group of text samples; for each of the groups of text samples, generating a sub-class context model based on the text samples in the respective group of text samples; merging particular ones of the sub-class context models that are determined to be similar to generate a hierarchical set of context models; selecting particular ones of the context models from among the hierarchical set of context models; and generating a class-based language model based on the selected context models, each of the selected context models corresponding to a respective class in the class-based language model.

BRIEF DESCRIPTION OF THE DRAWINGS

Like reference numbers and designations in the various drawings indicate like elements.

DETAILED DESCRIPTION

Figure 1:
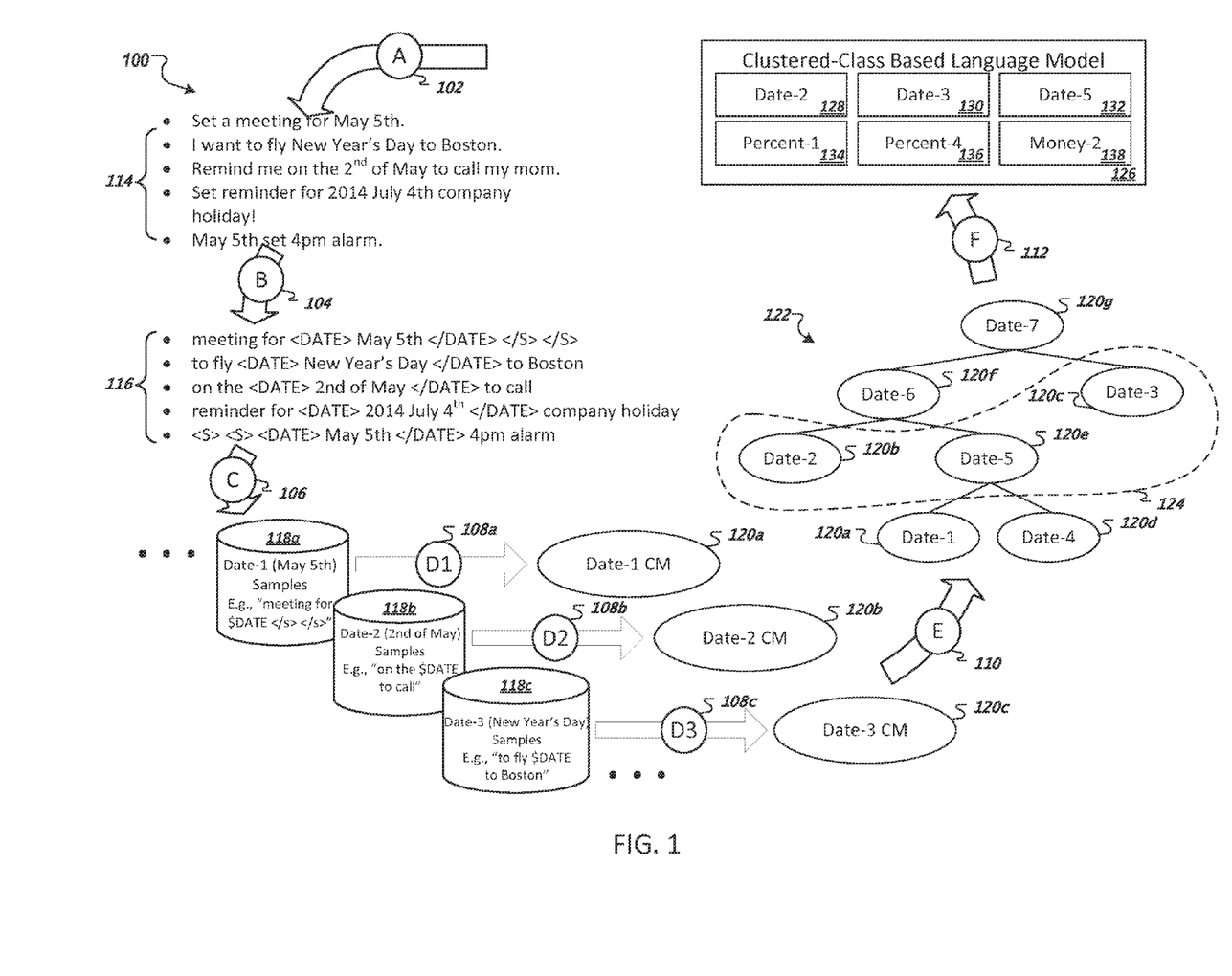
FIG. 1 is a schematic diagram of an example process for generating a clustered-class based language model.

With reference to FIG. 1, a schematic diagram is shown of an example process 100 for generating a clustered-class based language model. The process 100 conceptually depicts stages of operations that may be performed to generate a class-based language model having classes that include clusters of one or more sub-classes for a given super-class. In some implementations, the process 100 may be carried out by the computer systems described further in this paper, such as system 400 depicted in FIG. 4.

At stage A (102) of the process 100, a plurality of text samples 114 are obtained that will be used as the basis for training a clustered-class based language model. The text samples 114 may be representative of how sequences of terms are used in a language so that a model can be constructed for predicting sequences of terms based on a statistical analysis of how the sequences are employed in the language. The text samples 114 may originate form one or more sources such as web pages, and other publicly available resources, and logs of natural language user search queries and voice queries. The set of text samples 114 can be limited to only text samples have been determined to include one or more terms that belong to a particular super-class of terms. A super-class of terms may be a group of terms that are related in one or more conceptual ways such as by topic or other category, such as dates, percentages, locations, colors, names, etc. The example super-class of FIG. 1 is dates, and the text samples 114 include different expressions of various dates (e.g., "Set a meeting for May 5th," "I want to fly New Year's Day to Boston," "Remind me on the 2nd of May to call my mom").

At stage B (104), the process 100 performs pre-processing operations on the text samples 114 to prepare them to be used in training language models. A set of processed text samples 116 is generated as a result of stage B (104). In some implementations, the processed text samples 116 can be shortened to include only a limited number of terms on either side of the dates (the dates are the "class terms") in each text sample, as the nearest terms can often provide a strong signal as to whether a date or other relevant class term will be included in a sequence of terms. The dates in each text sample can also be labeled, as with the <DATE> and </DATE> tags that span the dates in each text sample. The labels can mark the location of the dates in a text sample, and can be used to train the class-based language model as an indication of the class of term that the spanned text belongs to.

At stage C (106), a respective group 118 of text samples is created for each different expression of a date in the processed text samples 116. Each processed text sample 116 can be classified into a sub-class that corresponds to the date expressed in the text sample 116. In some implementations, each different expression of a date in the text samples can correspond to a unique sub-class so that only text samples 116 that have substantially identical dates are grouped together. For example, a first group 118a of text samples includes text samples 116 that have the date expression "May 5th," a second group 118b includes text samples 116 that have the date expression "2nd of May," and a third group 118c includes text samples 116 that have the date expression "New Year's Day."

At stage D (108), sub-class context models are generated based on each group 118 of text samples. For example, at stage D1 (108a), the Date-1 sub-class context model 120a is generated based on the samples in set 118a; at stage D2 (108b), the Date-2 sub-class context model 120b is generated based on the samples in set 118b; and at stage D3 (108c), the Date-3 sub-class context model 120c is generated based on the samples in set 118c. A context model is generally an n-gram model that is trained on text samples whose class term (e.g., date, percentage, time) is replaced by a generic class identifier (e.g. $DATE) and that have been truncated to span only n words to the left of the class term, the class term, and n words to the right of the class term. In some implementations, the text samples may be formatted in other ways when training a context model, in a manner that indicates the context of how class terms are used in representative samples of a language. In some implementations, a context model may be a language model that is built on a set of training text samples that express context for a particular set of class terms. For example, a sub-class context model may be built on text samples that all have the same particular class term (e.g., "May 8"). A merged, intermediate context model may be built on multiple clusters of text samples that include one of multiple class terms according to the sub-classes that have been merged or clustered (e.g., "May 8" and "August 9"). When the activity models are built, the actual class terms may be replaced with the super-class identifier such as $DATE.

At stage E (110), the sub-class context models 120 that are generated at stage D (108) are added to a hierarchical set 122 of context models. The hierarchical set 122 can be generated by successively merging two or more context models, adding the merged context models to the hierarchy, and repeating until all of the context models have been merged into a super-class context model at the top of the hierarchy. For example, the hierarchy 122 may start at the bottom with the sub-class context models 1, 2, and 3 (Date-1 CM, Date-2 CM, and Date-3 CM, respectively). The most similar or otherwise closely related pair of sub-class context models can be identified using, for example, Kullback-Liebler divergence. The pair of sub-class context models that are determined to be most similar can be merged. The merged context model is an intermediate-class context model that is added to the hierarchy 122 as a descendant of the sub-class context models. Thereafter, the hierarchy 122 can continue to be constructed by repeatedly analyzing the context models in the hierarchy that do not have descendants (including both sub-class context models and merged intermediate-class context models) to identify and merge the closest, most similar context models, and adding the resulting merged context model to the hierarchy. For example, the sub-class context models 1 (120*a*) and 4 (120*d*) may be identified initially as the closest pair of sub-class context models, and they are merged to generate intermediate-class context model 5 (120*e*). In the next iteration, sub-class context model 2 (120*b*) and intermediate-class context model 5 (120*e*) may be identified as the closest pair of previously unmerged context models, and they are merged to generate intermediate-class context model 6 (120*f*). Next, intermediate-class context model 6 (120*f*) and sub-class context model 3 (120*c*) are merged to produce super-class context model 7 (120*g*) to complete the hierarchical set 122.

At stage F (112), the process 100 determines the clustered-classes to provide in a clustered-class based language model 126 for a particular super-class. The clustered-class based language model can have respective clustered-classes for each of multiple super-classes (e.g., a set of clustered-classes for dates, a set of clustered-classes for percentages, a set of clustered-classes for currency). The clustered-class based language model 126 can have a plurality of clustered-classes that each correspond to one or more clusters of sub-classes from a super-class. Taken together, the clustered-classes can provide coverage of all the sub-classes for a super-class. In the example shown in FIG. 1, the clustered-class based language model 126 has three clustered classes that encompass all of the sub-classes: date-2 128, date-3 130, and date-5 132. The clustered-classes 128, 130, 132 correspond to selections of context models from the hierarchy 122. Date-2 128 corresponds to the sub-class "2nd of May," date-3 130 corresponds to the sub-class "New Year's Day," and date-5 132 corresponds to the cluster of sub-classes 1 ("May 5th") and 4. As described in greater detail below, the selection of context models from the hierarchy 122 of context models—and hence the combinations of clustered-classes—can be effected so as optimize one or more metrics of the resulting clustered-class based language model 126.

Figure 2:
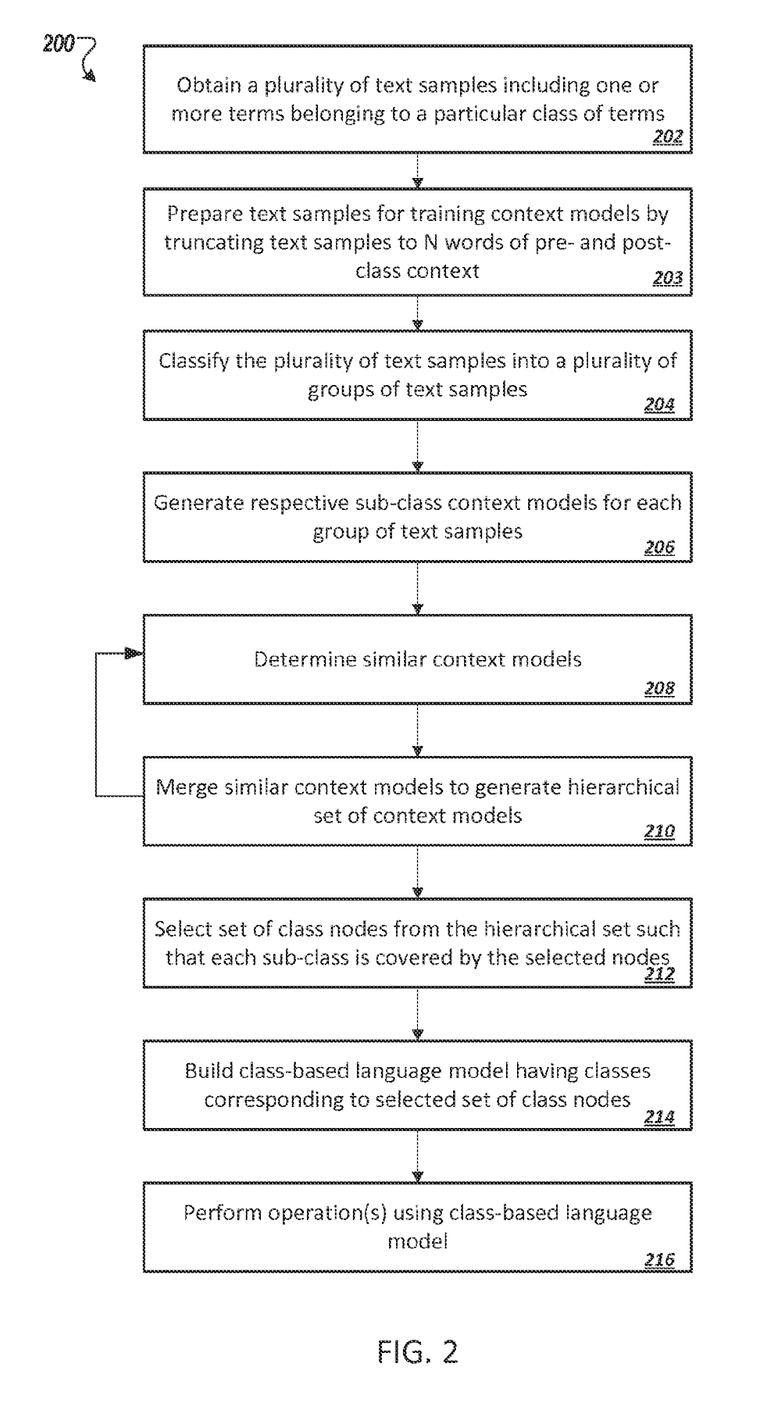
FIG. 2 is a flowchart of an example process for generating a clustered-class based language model.

FIG. 2 is a flowchart of an example process 200 for generating a class-based language model. The class-based language model generated by the process 200 can include multiple classes that each correspond to one or more aspects of a particular super-class. Some of the classes in the class-based language model can be formed by merging (clustering) one or more sub-classes of the super-class with other sub-classes so that the resulting class-based language model has an optimal number and separation of classes. For example, the class-based language model which is generated by the process 200 may include multiple different sub-classes that allow for better distinction among different terms within the super-class than that of a class-based language model that includes only the super-class, but that does not break the super-class into so many classes as would significantly diminish the benefits of class-based language models. The process 200 may be carried out in some implementations by the systems described in this document, such as system 400 depicted in FIG. 4.

The process begins at stage 202, in which text samples are obtained that will be used to train one or more context models representing the different contexts in which various class terms appear. The text samples can be obtained from one or more corpora of data. The text samples can be representative of how sequences of terms are used in a natural language, such as English, Spanish, French, Mandarin, etc. In some implementations, the text samples can be identified from logs of session data collected from one or more users. For example, the text samples may be identified from logs of user-submitted queries (e.g., search queries) or from logs of transcribed voice queries (speech recognition results). In some implementations, the text samples may be scraped from one or more electronic documents. For example, web pages and other publicly accessible documents may be parsed and text samples identified therefrom, which may reflect the use of terms in a particular language.

All or a portion of the text samples may include one or more terms that belong to a particular super-class of terms. If not all of the text samples include such terms, then a subset of the text samples that do include such terms can be identified and used in the remainder of the process 200 for training context models. The super-class of terms can generally include any terms that are within a particular category of terms. In some implementations, terms within a super-class of terms may be conceptually related. The context of how terms within a super-class are used in a language may or may not be similar. Examples of super-classes include dates, percentages, foods, times, music, names, song names, money, time, city, state, address numbers, chapter numbers, geographic locations, postal codes, operands, phone numbers, uniform resource locations, and more. In some implementations, specific instances of terms within a super-class can be replaced in text samples that are used to train a class-based language model with an identifier of the super-class so that the context model can determine probabilities that sequences of terms in an input string would include one or more terms within the super-class generally. Among the benefits of a class-based language model trained in this manner is that the total number of text samples needed to train the context model can be substantially reduced. Rather than needing text samples that include sufficient diversity and frequency for many specific terms within a super-class to adequately train a context model, probabilities can be determined for sequences of terms for the super-class generally, rather than for each specific instance of the super-class.

In some implementations, the process 200 can include pre-processing the text samples to condition them for training context models in the subsequent stages of the process 200. Pre-processing occurs at box 203. In some implementations, the obtained text samples can be normalized by filtering out any text samples that do not include terms within a particular super-class, adjusting the relative frequencies of text samples that originated from particular sources or users, adjusting the relative frequencies of text samples having particular terms, and re-writing text samples to a limited set of characters (e.g., lowercase characters) or substituting particular terms with related terms (e.g., expanding contractions). Pre-processing can also include identifying and labeling (annotating) the one or more terms in each text sample that belong to the relevant super-class.

For example, for a date super-class, the text sample "Remind me to call Jen on August 5" can be labeled with the <DATE> class identifier: "Remind me to call Jen on <DATE> August 5</DATE>." Once the super-class terms are identified, the text samples can be truncated. In some implementations, the text samples can be truncated to include only the n terms on either side of the identified super-class terms. For example, the text samples can be truncated to include only the one (n=1) or two (n=2) terms (if any) on the left and right of the super-class term(s) in order to train the context models using bi-gram or tri-gram context, respectively. In some implementations, further pre-processing of the text samples can include replacing the identified series of one or more super-class terms in each text sample with a class identifier. In some implementations, the class identifier can indicate the super-class of the replaced terms (e.g., date). For example, the above-mentioned text sample can be truncated to include only the n=3 context terms surrounding the superclass terms, and the identified date can be replaced with a class identifier: "call Jen on $DATE </s></s></s>" (here, </s> signifies the end of a sentence since the text sample does not include any terms that follow the date). In some implementations, the class identifier can indicate a sub-class of the replaced terms (e.g., holidays, mm_dd_yyyy formatted dates) so that text samples having terms within the same super-class have terms replaced by different sub-class identifiers corresponding to the sub-class of the terms within the text samples. All, none, some, or more of these pre-processing techniques may be performed on the text samples. For example, the identified super-class terms may not be replaced with class identifiers in some implementations.

At stage 204, the text samples (or pre-processed text samples) that include terms belonging to a particular super-class are assigned to different groups of text samples. Each group of text samples can correspond to a different sub-class of terms. Text samples whose super-class terms are determined to further belong to a particular sub-class can be assigned or otherwise classified into the group of text samples corresponding to that sub-class. For example, in the percentages super-class, respective sub-classes may exist for specific values such as "one percent," "the first percent," "99th percentile," and "75-percent." Text samples that include one of these strings of terms to express a percentage value can be assigned to a corresponding group of text samples. In this way, groups of text samples can be generated by separating the text samples into groups based on the sub-class of the super-class terms in each text sample. In some implementations, for each group of text samples, the super-class terms for all the text samples in the group are determined to belong to the same sub-class of terms.

The process 200 can identify multiple sub-classes for a given super-class of terms in one or more ways. In some implementations, the sub-classes may be pre-defined, such as by user input. For example, the sub-classes may be conceptually related and specified by user input. Dates, for instance, may be divided into sub-classes based on whether the date is a holiday or based on the format of how the date is expressed in a text sample (e.g., whether the date includes the year, and whether the day is provided before or after the month). In some implementations, the sub-classes are not pre-defined, but are instead determined upon evaluation of the text samples that are to be grouped. In some implementations, a sub-class, and therefore a corresponding group of text samples, can be created for each unique instance of super-class terms in the text samples. In these implementations, only text samples whose super-class terms are identical (or substantially identical) are grouped together. For example, text samples that respectively include the super-class terms "August 5," "May 5," "5th of May," "Cinco de Mayo," and "May 5, 2014" can each be assigned to different groups. Thus, even where the super-class terms refer to a common value (e.g., May 5; May 5, 2014; Cinco de Mayo), the text samples with each different expression of the value can be assigned to different groups. One group may correspond to the sub-class of terms "May 5," a second group may correspond to the sub-class "May 5, 2014," and a third group may correspond to the sub-class "Cinco de Mayo." In some implementations, a relatively large number of groups of text samples may be created by only grouping text samples whose super-class terms are identical (or substantially identical). For example, there are potentially thousands of ways that all the different dates in a year can be stated in a language, and a respective group of text samples can be generated for each of the various expressions of such dates.

At stage 206, a sub-class context model is generated for each of the groups of text samples. Each sub-class context model can be generated in some implementations by statistically training the model on the text samples in the respective group of text samples that corresponds to the model. The text samples may be pre-processed so that, for example, the sub-class context models are trained on truncated text samples that include only the identified class terms and one or more terms that follow and/or precede the class terms. The terms that belong to the class may also be replaced with a class identifier, for example, which may be a common class identifier that replaces the class terms in text samples across all of the groups of text samples. If the class terms are replaced with a class identifier in the training samples, the resulting sub-class context models may indicate probabilities that terms within the class will appear in a sequence of terms in a language given the appearance of one or more other terms in the sequence. If the original class terms are not substituted with a class identifier, the resulting sub-class context models may each indicate respective probabilities that particular sub-class terms will appear in a sequence of terms in a language given the appearance of one or more other terms in the sequence. The sub-class context models may be trained, in some implementations, on shortened text samples that have been truncated from full-length samples. For example, models may be trained on text samples that are shortened to include only the text spanning from n terms that precede the class terms in the text sample through the n terms that follow the class terms in the text sample. Thus, for n=2, the full-length text sample, "I'll be leaving for the ballpark at 7 on the <DATE>4th of August</DATE>," may be shortened to the training sample "on the <DATE>4th of August</DATE> </s> </s>" (where </s> signifies end of sentence or end of text sample). Accordingly, the n terms nearest the class terms in the training samples may provide context by which the context models are statistically trained that indicates how the class terms are used in a language. The resulting context models may indicate, for example, probabilities of particular sequences of terms given one or more of the n terms that flank a class term. Where n=2, the context models may use two-word context to predict sequences of terms (i.e., tri-gram model), and where n=3, the context models may use three-word context to predict sequences of terms (i.e., 4-gram model). As previously noted, in some implementations, the class terms in the training text samples may be replaced with a class identifier so that differences among the various sub-class context models are not dependent on the particular sub-class terms corresponding to each context model, but rather reflect differences in the context of how different sub-class terms are used in a language.

At stage 208, similarities are determined among one or more context models. Similarities among context models may be determined according to one or more metrics. In some implementations, context models are compared using the Kullback-Leibler Divergence technique, from which a distance metric is determined that indicates how similar or dissimilar the compared context models are. In some implementations, sub-class context models for corresponding sub-class terms that are used in similar contexts in a language may be determined to be similar. For example, a first sub-class context model that was trained on text samples corresponding to the sub-class terms "May 9" may be determined to be most similar to a second sub-class context model that was trained on text samples corresponding to the sub-class terms "May 10." The similarity in this example may reflect that there is relatively little variation in how people use either the "May 9" or "May 10" dates in a language, and therefore, the n context terms on either side of both dates have relatively similar distributions in each context model.

At stage 210, the process 200 merges similar context models to generate a hierarchical set of context models. In some implementations, the process 200 may repeatedly jump between stage 208 and stage 210 to determine similar context models, and merge them until a complete hierarchy of context models is generated. The complete hierarchy may be achieved once a super-class context model is generated that encompasses all of the sub-class context models, for example. The hierarchy can be built from the bottom-up by first adding all or some of the sub-class context models to a set of context models, evaluating the set of context models to determine a pair of context models that are most similar in the set (or a pair of context models whose similarity meets a threshold similarity score), merging the identified pair of context models to generate an intermediate context model, adding the intermediate context model to the hierarchical set as a parent to the merged pair of context models, and repeating until the complete hierarchical set is generated. In each iteration of the process 200 between stages 208 and 210, another pair of context models determined to be the most similar among the un-merged sub-class or intermediate context models are merged, and the resulting intermediate context model is added to the hierarchical set. In the first iteration, only sub-class context models as generated at stage 206 are available to be merged. In subsequent iterations, the process 200 identifies any pair of context models, whether consisting of sub-class context models, intermediate context models, or both, that have not yet been merged and that are determined to be the most similar among the un-merged set of context models, and merges the pair. The process 200 can continue until a super-class context model is generated and added to the hierarchical set, after which there may be no pairs of un-merged context models available to merge.

Figure 3:
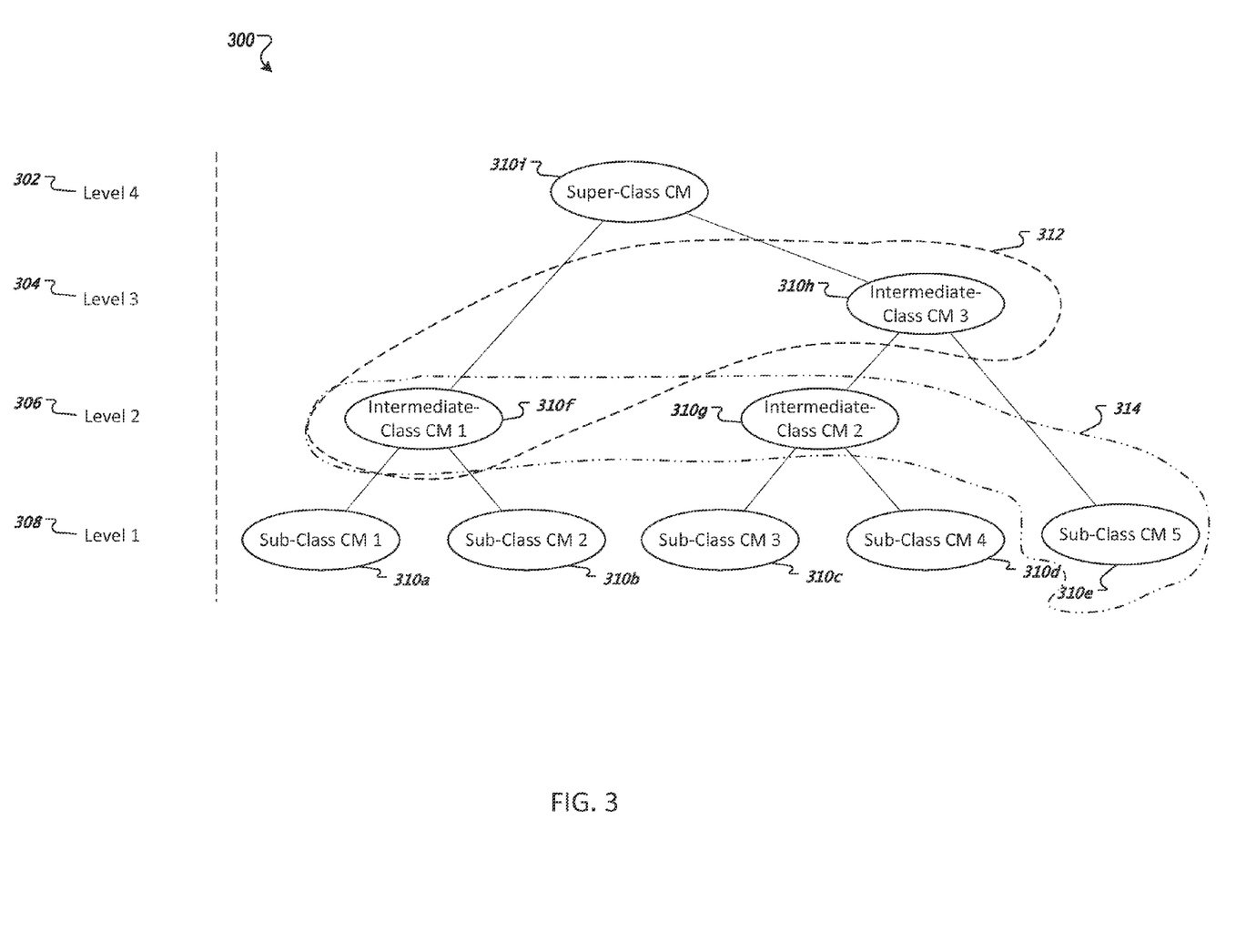
FIG. 3 depicts an example of a hierarchical set of sub-class context models and merged context models.

One example of a hierarchical set of context models is depicted in FIG. 3. The example set of context models 300 includes five sub-class context models and four levels in the hierarchy. While the example set 300 is representative of the concept of a hierarchy of merged context models, in practice, some sets may include hundreds, thousands, or even many more context models. For example, for text samples in a training set that are classified into different groups depending on a date expressed in each text sample, more than 300 groups may be generated just to represent unique dates in a calendar year, and a respective sub-class context model may be trained on each group. Moreover, since dates can be expressed in several variations (e.g., 4th of July, July 4th, Independence Day, the 4th, etc.), a sub-class context model may be generated for each variation a particular date, which would further expand the total number of sub-class context models in a set.

The example set of context models 300 includes 4 levels 302-308. The levels conceptually indicate different generations of context models. Context models in the higher levels are the progeny of lower-level context models, and context models in the lower levels are ancestors of the higher-level context models. For example, the complete hierarchical set 300 can be generated by starting with an initial set of sub-class context models 310a-e at level 1 (308). The sub-class context models are compared by one or more metrics (e.g., using Kullback-Leibler divergence), and the two sub-class context models that are determined to be most similar are merged to generate an intermediate-class context model. In this example, sub-class context model 1 (310a) and sub-class context model 2 (310b) may be determined to be the closest pair of models in the initial iteration, and they are merged to generate intermediate-class context model 1 (310f), which is represented in the hierarchy at level 2 (306). In some implementations, a merged context model can be generated by training a context model on the respective sets of text samples that were used to train each of the parent context models. For example, intermediate-class context model 1 (310f) may be generated by training the context model 310f based on both the text samples that were used to train sub-class context model 1 (310a) and sub-class context model 2 (310b). In some implementations, context models may be directly merged without starting from the original sets of text samples, but may instead merge probability distributions from the parent context models themselves, for example.

In the next iteration of building the example hierarchical set of context models 300, the process 200 identifies the closest (most similar) context models among the group consisting of sub-class context model 3 (310c), sub-class context model 4 (310d), sub-class context model 5 (310e), and intermediate-class context model 1 (310f). The process 200 may determine, for example, that sub-class context model 3 (310c) and sub-class context model 4 (310d) are the most similar in this group, and those two context models are merged to produce intermediate-class context model 2 (310g). Subsequent iterations continue the process of identifying and merging the closest pairs of context models. For example, in a third iteration, the sub-class context model 5 (310e) and intermediate-class context model 2 (310g) may be merged as a result of being determined to be the most similar context models in the group consisting of intermediate-class context model 1 (310f), intermediate-class context model 2 (310g), and sub-class context model 5 (310e). Based on the merge of context models in this third iteration, the intermediate-class context model 3 (310h) is generated, and is represented at level 3 (304) of the hierarchy since it is two generations removed from its most distant sub-class context model (i.e., sub-class context model 3 (310c)). Finally, in a fourth iteration, intermediate-class context model 1 (310f) and intermediate-class context model 3 (310h) are merged to produce the super-class context model 310i. The super-class context model 310i is a species of merged context models that descends from all of the original sub-class context models 1-5 (310a-310e).

Referring again to the flowchart of example process 200 in FIG. 2, at stage 212, particular ones of the context models are selected from the hierarchical set. The selected context models can subsequently be used to generate a clustered-class based language model in which the classes each correspond to one of the selected context models. In some implementations, the selected context models can be selected so as to optimize one or more metrics of the resulting clustered-class based language model. Generally, context models at lower levels in the hierarchical set may be more accurate at predicting sequences of terms that include a narrow set of sub-class terms, whereas context models at higher levels of the hierarchical set may be less accurate at predicting sequences for particular sub-class terms, but generally more adapted to predict sequences of terms for a broader set of sub-class terms. For example, a first sub-class context model that was trained on a group of text samples for the sub-class term "December 23" is particularly programmed for probabilities of sequences of terms including the expression "December 23." A second sub-class context model that was trained on a group of text samples for the sub-class term "November 23" is particularly programmed for probabilities of sequences of terms including the expression "November 23." The first sub-class language may not be as attuned to sequences of terms involving "November 23," and the second sub-class context model may not be as attuned to sequences of terms involving "December 23." If the first and second context models are merged, the resulting intermediate context model may be more capable of predicting sequences of terms involving either November 23 or December 23 than the first or second context models individually. But because some of the differences between the first and second context models may be averaged or otherwise meshed in the merged intermediate context model, the intermediate context model may not be as finely tuned to predict sequences of terms involving either date as either the first or second sub-class context models for their respective date. As differences among context models are continually meshed at higher levels of the hierarchy, the context models become less-specific to particular sub-class terms. At the top of the hierarchy, the super-class context model is least specific to particular sub-class terms. For example, the super-class context model be adapted to handle a wide range of date terms, if date is the relevant class. However, the super-class context model may be less accurate at predicting sequences of terms for a particular date than the sub-class context model that was trained only text samples that included the particular date.

Higher-level context models may be desired in some instances to maximize the benefits of class-based language modeling, such as needing fewer and less diverse text samples to train the context model. On the other hand, lower-level context models may be desired in some instances to preserve statistically significant differences in the way that different sub-class terms are used in a language. For example, the context in which "Cinco de Mayo" is most commonly used in sentences may be very different from the way that other dates, such as "April 15", are commonly used in sentences. For instance, the context terms around "Cinco de Mayo" may frequently be different than the context terms around "April 15." Therefore, lower-level context models may be useful to preserve such differences.

The process 200 can select a subset of context models from the hierarchical set so as to achieve a balance between the benefits of a more general class-based language model from higher levels in the hierarchy, and the benefits of the more narrowly trained lower-level context models. The selected subset of context models can include context models that, collectively, encompass all of the sub-class context models. For example, in the hierarchical set of context models 300 shown in FIG. 3, the two different selections 312, 314 of context models 310 are illustrated. A first selection 312 of context models 310 includes intermediate-class context model 1 (310f) and intermediate-class context model 3 (310h). The first selection 312 includes context models that together descend from all five of the sub-class context models in the hierarchical set. In some implementations, the selected context models may include no overlap in ancestry. For example, the first selection 312 does not also include intermediate-class context model 2 (310g), which is a parent of the selected intermediate-class context model 3 (310h). A second selection 314 consists of intermediate-class context model 1 (310f), intermediate-class context model 2 (310g), and sub-class context model 5 (310e). This example selection 314 likewise encompasses all of the sub-class context models without ancestral overlap.

In some implementations, the selection of the context models at stage 212 can be determined by evaluating the performance of respective clustered-class based language models that are generated for each of multiple different candidate selections. For example, with reference to FIG. 3, the first selection 312 and the second selection 314 may each be candidate selections of context models by which a respective clustered-class based language model is generated. A common set of input data may then be passed through the respective clustered-class based language models, and the candidate selection that yields the best performing (by one or more metrics) clustered-class based language model can be used as the final selection of context models to the exclusion of the other candidate selections. For example, the common set of input data may be generated from a reserved set of text samples that include terms across many sub-classes, the reserved set not having been used to train the sub-class context models. Portions of the text samples (e.g., with the sub-class terms redacted) may be fed to the corresponding clustered-class based language models for each candidate selection, and each clustered-class based language model can be scored on how well the redacted sub-class terms are predicted. Different candidate selections may result in clustered-class based language models that predict terms within a class in a sequence of terms with varying degrees of accuracy. The particular clustered-class based language model that predicts the class terms with greatest accuracy, for example, may be selected. In some implementations, a final selection of context models from the hierarchy can be made by evaluating one or more characteristics of one or more candidate selections of context models without generating clustered-class based language models to evaluate the selections.

At stage 214 of the process 200, a clustered-class based language model is generated. In some implementations, multiple clustered-class based language models are generated as part of evaluating candidate selections of context models at stage 214, and one or more of the clustered-class based models may be selected as an output for stage 214. The classes in a clustered-class based language model can correspond to the various context models that were selected from the hierarchy. The context model may be "clustered-class" because it may comprise classes that correspond to clusters of one or more sub-classes. Some of the clustered classes may correspond to multiple sub-classes, such as a clustered class that corresponds to an intermediate-class context model that was merged from two or more other context models. Some of the clustered classes may correspond to a single sub-class, such as a clustered class that corresponds to a particular sub-class context model.

Consider, for example, the two selections 312, 314 of context models from the hierarchy 300 of FIG. 3. In a first clustered-class based language model generated based on the first selection 312, the model can include clustered-classes that correspond to intermediate-class context model 1 (310f) and intermediate-class context model 3 (310h). The class that corresponds to intermediate-class context model 1 (310f) can include the cluster of sub-class terms from its ancestor context models: sub-class context model 1 (310a) and sub-class context model 2 (310b). Similarly, the class that corresponds to intermediate-class context model 3 (310h) can include the cluster of sub-class terms from its ancestor context models: sub-class context models 3, 4, and 5 (310c, 310d, and 310e, respectively). With respect to the second selection 314, a clustered-class based language model generated from this selection 314 may include clustered-classes corresponding to intermediate-class context model 1 (310f), intermediate-class context model 2 (310g), and sub-class context model 5 (310e). Accordingly, the classes in the clustered-class based language model for the second selection 314 may cluster sub-classes 1 and 2 together, sub-classes 3 and 4 together, and sub-class 5 alone. A class-based language model having clustered-classes can be advantageous as compared to a super-class context model because the clustered-classes break the super-class into multiple components that are more specific than the super-class in a way that leads to improved context modeling accuracy.

A clustered-class based language model can be conceptually understood through an example of how one such context model may be generated. In this example, a clustered-class based language model is generated based on the first selection 312 of context models from hierarchy 300. A first of the classes in the context model is a cluster of the sub-classes for sub-class context models 1 and 2 (310a and 310b). A second of the classes is a cluster of the sub-classes for sub-class context models 3, 4, and 5 (310c, 310d, and 310e). In some implementations, the clustered-class based language model can be generated by classifying training text samples belonging to sub-classes 1 and 2 into a first clustered group of text samples, and classifying training text samples belonging to sub-classes 3, 4, and 5 into a second clustered group of text samples. The respective class terms in each of the training text samples can be substituted with a class identifier for the corresponding cluster. Thus, if sub-classes 1-5 corresponded to the dates "August 3," "August 4," "4th of August," "8th of July," and "8th of June," respectively, then the text samples that included either "August 3" or "August 4" may be grouped and the dates substituted with a $Cluster1 class identifier, and the text samples that included either "4th of August," "8th of July," or "8th of June" may be grouped and the dates substituted with a $Cluster2 class identifier. The two clustered groups of text samples with the two different class identifiers can then be used as input to train the clustered-class based language model.

At stage 216, the clustered-class based language model can be used to perform one or more operations. For example, the clustered-class based language model may be employed in an automatic speech recognizer to perform speech recognition. In some implementations, the context model can be used in statistical machine translation, optical character recognition, information retrieval systems, and/or in other contexts.

Figure 4:
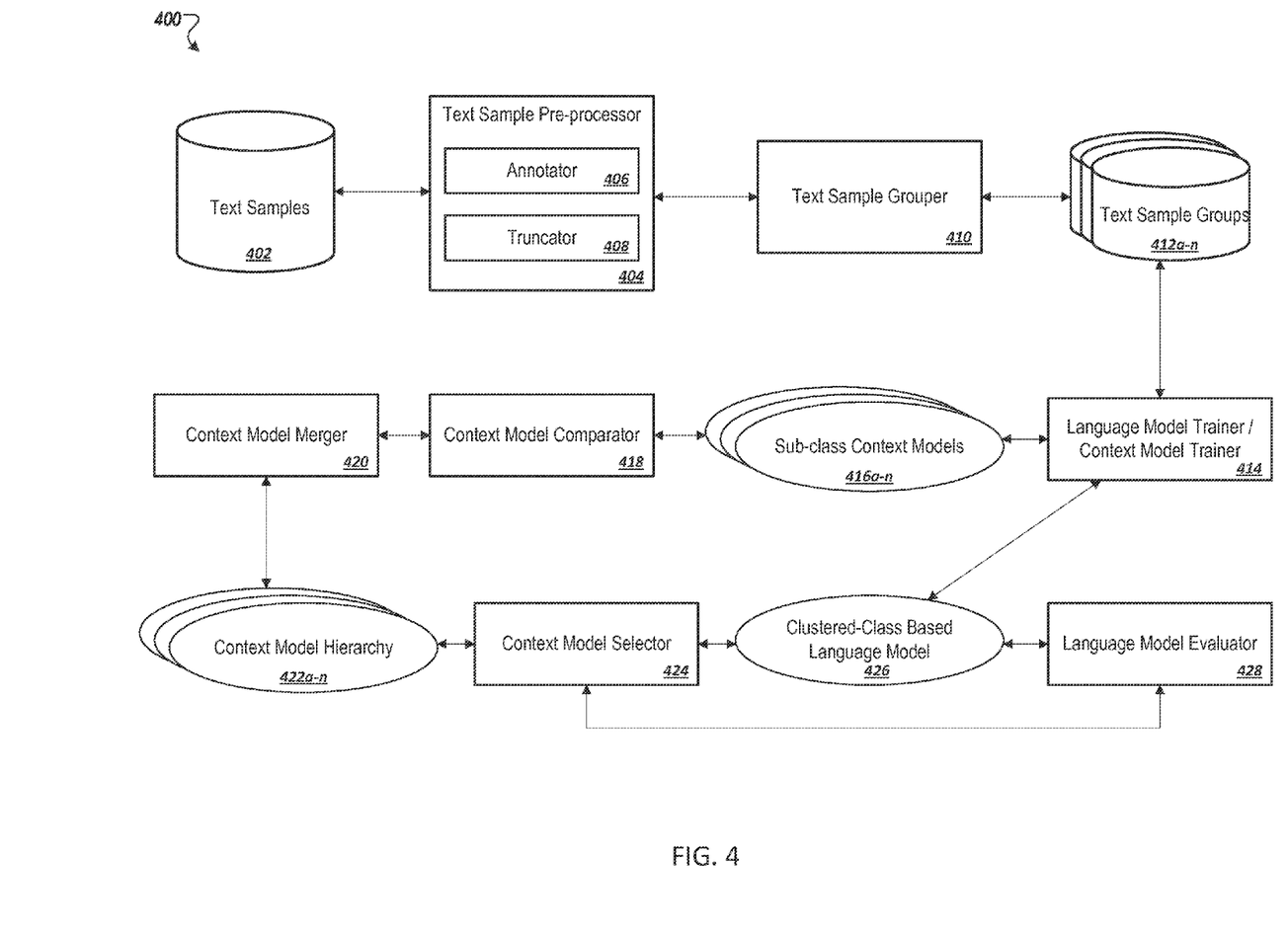
FIG. 4 is a conceptual diagram of an example system for generating a clustered-class based language model.

FIG. 4 is a conceptual diagram of an example system 400 for generating a clustered-class based language model. In some implementations, the system 400 may be configured to carry out one or more of the processes discussed herein, such as process 200 shown in the flowchart of FIG. 2. The system 400 can include all or some of a text sample repository 402, text sample pre-processor 404, text sample grouper 410, text sample groups repository 412a-n, context model merger 420, context model comparator 418, sub-class context models 416a-n, context model and language model trainer 414, context model hierarchies 422a-n, context model selector 424, clustered-class based language model 426, and language model evaluator 428. The particular configuration of the system 400 is illustrative of an example system for generating a clustered-class based language model. However, in some implementations, the functions performed by particular ones of the components of system 400 may be performed additionally or alternatively by other ones of the components. Moreover, particular ones of the components provided in alternate configurations. For example, the text sample grouper 410 may or may not be included in the text sample pre-processor 404, or particular other components may be combined or separated in particular implementations.

The text sample repository 402 can store or otherwise provide access to text samples, all or some of which may be usable to train context models by the system 400. The text samples may be strings of text including sequences of terms, such as sentences or clauses. The text samples may be obtained from one or more sources, such as user-seeded samples, text scraped from electronic resources (e.g., web pages), logs of user search queries, and logs of voice queries, for example. Text samples in the repository 402 that are used to train the context models may each include one or more terms that belong to a particular class of terms. The class may be a category or a topic of interest, such as dates, percentages, locations, music, etc. The class itself may be considered a super-class that can be broken down into two or more sub-classes.

The text sample pre-processor 404 can perform one or more pre-processing operations with text samples from repository 402 to prepare the text samples to be used in training a context model. The pre-processor 404 may apply one or more filters or other search criteria to identify only the text samples in repository 402 that have terms belonging to a particular class, which set of terms may be used thereafter by the system 400 to train context models. The pre-processor 404 can include an annotation module 406 and a truncation module 408. The annotation module 406 can identify and label the class terms in text samples. For example, the text sample "We have a vacation planned for the week of the 5th of August," can be labeled by the annotation module as: "We have a vacation planned for the week of the <DATE>5th of August</DATE>." In some implementations, the annotation module 406 can replace the identified class terms with a super-class identifier (e.g., $DATE) or a sub-class identifier (e.g., $DATE8): "We have a vacation planned for the week of the $DATE." In some implementations, the class terms are not replaced with a class identifier. The truncation module 408 can crop a text sample around the class terms. For example, the truncation module 408 may delete terms from a text sample that are outside of a span of n terms to the left and right of the class terms (or the class identifier that may have replaced the class terms). Thus, for example, the truncation module 408 may delete the terms from the text sample above that are outside n=2 terms from the class terms: "of the <DATE>5th of August</DATE></s></s>" (where </s> signifies the end of the sentence or end of text sample). In an example for another implementation, a truncated text sample with substituted class identifier may be represented as follows: "of the $DATE </s> </s>."

The text sample grouper 410 classifies text samples, either before or after being pre-processed, into different groups of text samples. In some implementations, a portion (e.g., a small portion) of the text samples are reserved for use in held-out tests that will be performed to evaluate the clustered-class based language model after it is built. The reserved text samples may not be used as training samples for training the context model. The different groups of classified text samples can each correspond to a different sub-class of terms. Text samples whose class terms belong to the sub-class for a particular group are assigned to that group. In some implementations, a unique sub-class (and therefore, a unique group) can be created for each unique expression of class terms in the text samples. Therefore, only text samples that include substantially identical class terms are deemed to belong to the same sub-class and classified in the same group of text samples. For example, a plurality of text samples that included the class terms "one-hundred percent," "hundred percent," and "ninety-nine percent" may all be assigned to different groups because the class terms are not identical, and may not be deemed to be substantially identical in some implementations. The result of the classification by the text sample grouper 410 can be stored in the repositories of text sample groups 412*a*-*n*, such as in a database.

The system 400 can also include a context model trainer 414. The context model trainer 414 is configured to train context models based on training text samples. The context model trainer 414 can build a context model in some implementations by statistically analyzing sequences of terms in the training samples, and constructing a model that includes one or more probability distributions that indicate likelihoods of sequences of terms in a language. For example, the context model may be able to indicate a probability that a particular term follows a given sequence of terms. The context models generated by the context model trainer 414 may also be configured to predict a term in a sequence, such as by selecting a term that has the highest probability of being in the sequence given the other terms in the sequence. The context model trainer 414 may be used to train a plurality of sub-class context models 416*a*-*n*, each sub-class context model being trained based on the corresponding group of text samples for the sub-class. The context model trainer 414 can also be used in other instances to train other context models. For example, the context model trainer 414 may be used to generate merged context models and to generate the clustered-class based language model 426 in some implementations.

The context model comparator 418 is operable to evaluate and compare context models. The context model comparator 418 in some implementations can determine a similarity score for pairs of context models and can select sufficiently similar context models to be merged. The context model comparator 418, in conjunction with the context model merger 420, which is configured to merge two or more context models to generate a merged (e.g., intermediate or super-class) context model, can build a hierarchical set of context models. The context model comparator 418 can identify the pair of context models in a set that are the most similar according to one or more metrics that comprise the similarity score (e.g., using a Kullback-Leibler divergence technique), and those context models can be provided to the context model merger 420 to generate a merged context model, which is added to the hierarchical set. The context model comparator 418 and context model merger 420 can continue identifying and merging similar context models in this manner until a complete hierarchical set is generated from the bottom-up. The resulting hierarchical set is represented by the plurality of context models in hierarchical set 422*a*-*n* in FIG. 4.

The context model selector 424 is configured to select particular language ones of the context models from the hierarchical set of context models 422*a*-*n* to form the basis of a clustered-class based language model 426. The context models selected by the context model selector 424 can include combinations of sub-class context models 416, intermediate (merged) context models, or both. Taken together, the selected context models include or descend from all or a subset of all of the sub-class context models. For example, for a hierarchical set that includes 3,500 sub-class context models, then the selected context models may include combinations of sub-class context models and intermediate context models that either directly include or descend from all 3,500 sub-class context models so as to provide coverage of all the sub-classes for a particular super-class. The context model selector 424 can operate in conjunction with language model evaluator 428 to select an optimal subset of context models from the hierarchical set 422. The context model selector 424 can make a plurality of candidate selections of context models. For each candidate selection, the context model trainer 414 can generate a clustered-class based language model having classes that correspond to the selected context models. Higher-level context models that have been merged from two or more sub-class context models can be used to form a clustered-class in the clustered-class based language model, the clustered-class being a class that corresponds to each of the constituent sub-classes of the merged, higher-level context model. The language model evaluator 428 can analyze one or more performance metrics of each of the clustered-class based language models that were generated based the candidate selections of context models from the hierarchical set 422, and one or more of the best performing clustered-class based language models 426 can be output for use in applications ranging from speech recognition to information retrieval systems, optical character recognition, and machine translation.

Figure 5:
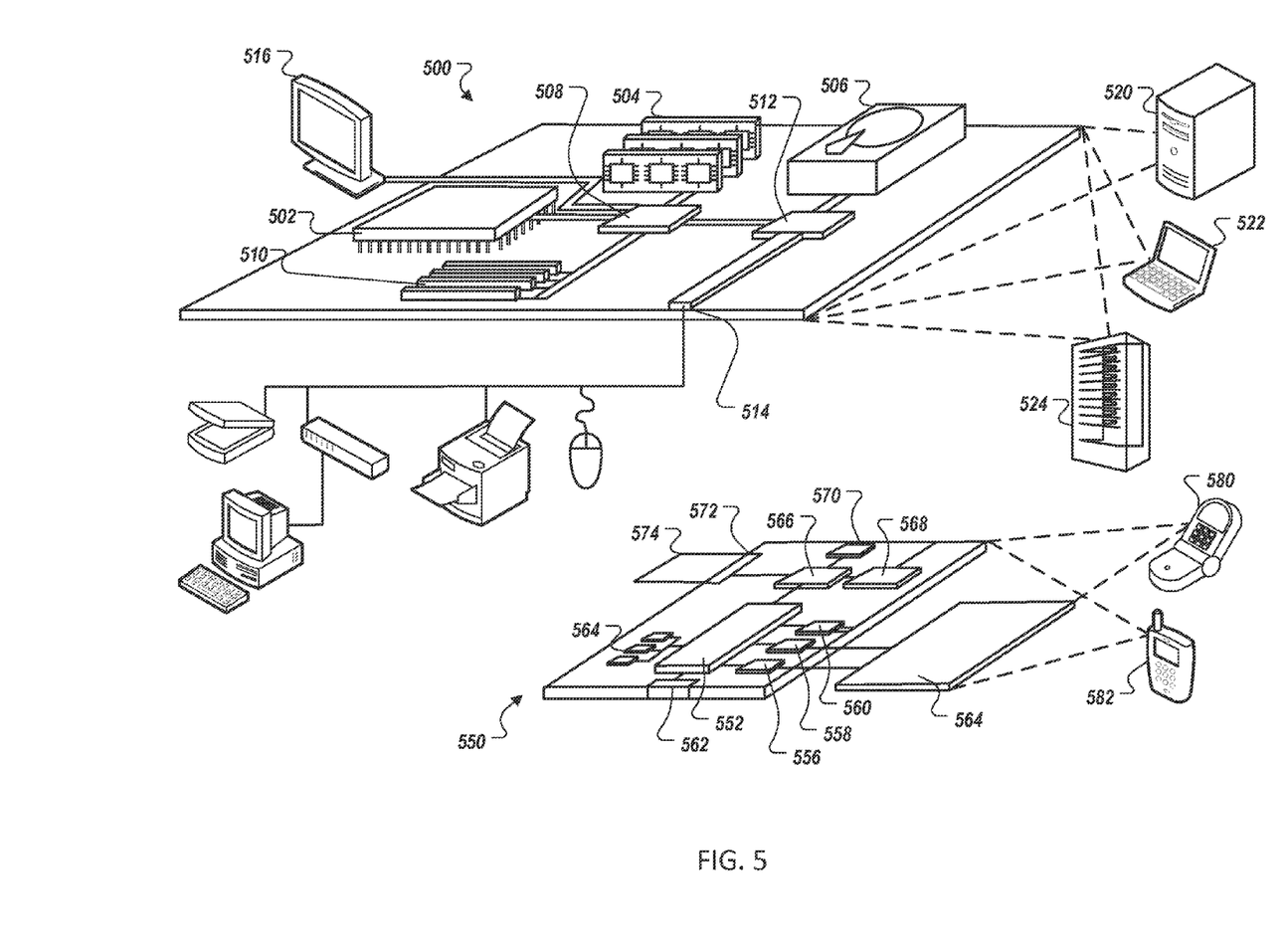
FIG. 5 shows an example of a computing device 500 and a mobile computing device that can be used to implement the techniques described herein.

FIG. 5 shows an example of a computing device 500 and a mobile computing device that can be used to implement the techniques described herein. The computing device 500 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

The computing device 500 includes a processor 502, a memory 504, a storage device 506, a high-speed interface 508 connecting to the memory 504 and multiple high-speed expansion ports 510, and a low-speed interface 512 connecting to a low-speed expansion port 514 and the storage device 506. Each of the processor 502, the memory 504, the storage device 506, the high-speed interface 508, the high-speed expansion ports 510, and the low-speed interface 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as a display 516 coupled to the high-speed interface 508. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 504 stores information within the computing device 500. In some implementations, the memory 504 is a volatile memory unit or units. In some implementations, the memory 504 is a non-volatile memory unit or units. The memory 504 may also be another form of computer-readable medium, such as a magnetic or optical disk.

The storage device 506 is capable of providing mass storage for the computing device 500. In some implementations, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. The computer program product may also contain instructions that, when executed, perform one or more methods, such as those described above. The computer program product can also be tangibly embodied in a computer- or machine-readable medium, such as the memory 504, the storage device 506, or memory on the processor 502.

The high-speed interface 508 manages bandwidth-intensive operations for the computing device 500, while the low-speed interface 512 manages lower bandwidth-intensive operations. Such allocation of functions is exemplary only. In some implementations, the high-speed interface 508 is coupled to the memory 504, the display 516 (e.g., through a graphics processor or accelerator), and to the high-speed expansion ports 510, which may accept various expansion cards (not shown). In the implementation, the low-speed interface 512 is coupled to the storage device 506 and the low-speed expansion port 514. The low-speed expansion port 514, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. In addition, it may be implemented in a personal computer such as a laptop computer 522. It may also be implemented as part of a rack server system 524. Alternatively, components from the computing device 500 may be combined with other components in a mobile device (not shown), such as a mobile computing device 550. Each of such devices may contain one or more of the computing device 500 and the mobile computing device 550, and an entire system may be made up of multiple computing devices communicating with each other.

The mobile computing device 550 includes a processor 552, a memory 564, an input/output device such as a display 554, a communication interface 566, and a transceiver 568, among other components. The mobile computing device 550 may also be provided with a storage device, such as a micro-drive or other device, to provide additional storage. Each of the processor 552, the memory 564, the display 554, the communication interface 566, and the transceiver 568, are interconnected using various buses, and several of the components may be mounted on a common motherboard or in other manners as appropriate.

The processor 552 can execute instructions within the mobile computing device 550, including instructions stored in the memory 564. The processor 552 may be implemented as a chipset of chips that include separate and multiple analog and digital processors. The processor 552 may provide, for example, for coordination of the other components of the mobile computing device 550, such as control of user interfaces, applications run by the mobile computing device 550, and wireless communication by the mobile computing device 550.

The processor 552 may communicate with a user through a control interface 558 and a display interface 556 coupled to the display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may provide communication with the processor 552, so as to enable near area communication of the mobile computing device 550 with other devices. The external interface 562 may provide, for example, for wired communication in some implementations, or for wireless communication in other implementations, and multiple interfaces may also be used.

The memory 564 stores information within the mobile computing device 550. The memory 564 can be implemented as one or more of a computer-readable medium or media, a volatile memory unit or units, or a non-volatile memory unit or units. An expansion memory 574 may also be provided and connected to the mobile computing device 550 through an expansion interface 572, which may include, for example, a SIMM (Single In Line Memory Module) card interface. The expansion memory 574 may provide extra storage space for the mobile computing device 550, or may also store applications or other information for the mobile computing device 550. Specifically, the expansion memory 574 may include instructions to carry out or supplement the processes described above, and may include secure information also. Thus, for example, the expansion memory 574 may be provide as a security module for the mobile computing device 550, and may be programmed with instructions that permit secure use of the mobile computing device 550. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. The computer program product contains instructions that, when executed, perform one or more methods, such as those described above. The computer program product can be a computer- or machine-readable medium, such as the memory 564, the expansion memory 574, or memory on the processor 552. In some implementations, the computer program product can be received in a propagated signal, for example, over the transceiver 568 or the external interface 562.

The mobile computing device 550 may communicate wirelessly through the communication interface 566, which may include digital signal processing circuitry where necessary. The communication interface 566 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 568 using a radio-frequency. In addition, short-range communication may occur, such as using a Bluetooth, WiFi, or other such transceiver (not shown). In addition, a GPS (Global Positioning System) receiver module 570 may provide additional navigation- and location-related wireless data to the mobile computing device 550, which may be used as appropriate by applications running on the mobile computing device 550.

The mobile computing device 550 may also communicate audibly using an audio codec 560, which may receive spoken information from a user and convert it to usable digital information. The audio codec 560 may likewise generate audible sound for a user, such as through a speaker, e.g., in a handset of the mobile computing device 550. Such sound may include sound from voice telephone calls, may include recorded sound (e.g., voice messages, music files, etc.) and may also include sound generated by applications operating on the mobile computing device 550.

The mobile computing device 550 may be implemented in a number of different forms, as shown in the figure. For example, it may be implemented as a cellular telephone 580. It may also be implemented as part of a smart-phone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although various implementations have been described in detail above, other modifications are possible. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:
1. A computer-implemented method, comprising:
obtaining, by a computing system, a plurality of text samples that each includes a respective class term that belongs to a same pre-defined class of topically related terms;
for each respective text sample among the plurality of text samples:
  (i) identifying that the respective class term of the respective text sample belongs to a particular sub-class, among a plurality of sub-classes, of the pre-defined class of topically related terms; and
  (ii) assigning the respective text sample to a particular group of text samples that corresponds to the particular sub-class to which the respective class term of the respective text sample belongs, such that the plurality of text samples are assigned among a plurality of groups of text samples and each respective group of text samples among the plurality of groups of text samples corresponds to a different one of a plurality of sub-classes of the pre-defined class of topically related terms;
generating, by the computing system and for each respective sub-class among the plurality of sub-classes, a respective sub-class context model that represents probabilities of language sequences determined based on the text samples assigned to the corresponding group of text samples for the respective sub-class;
merging, by the computing system, particular ones of the sub-class context models that are determined to be similar to generate a hierarchical set of context models;

selecting, by the computing system, particular ones of the context models from among the hierarchical set of context models;

generating, by the computing system, a class-based language model that includes, for each of the selected context models, a respective class that corresponds to the respective context model; and providing the class-based language model in a speech recognition system and transcribing speech characterized in an audio signal to text using the class-based language model in the speech recognition system.

2. The computer-implemented method of claim 1, wherein at least a portion of the text samples in the plurality of text samples are obtained from logs of natural-language search queries or from logs of speech recognition results.

3. The computer-implemented method of claim 1, wherein the pre-defined class of topically related terms comprises dates, and wherein the respective sub-classes of terms each comprises a different set of one or more dates.

4. The computer-implemented method of claim 3, wherein the respective class term of a first text sample among the plurality of text samples indicates a date without naming any of a calendar year, a calendar month, or a calendar day.

5. The computer-implemented method of claim 1, wherein the pre-defined class of topically related terms comprises one of percentages, song names, currency names or values, times, city names, state names, address numbers, chapter numbers, operands, times, and geographic locations.

6. The computer-implemented method of claim 1, further comprising determining that the particular ones of the sub-class context models are similar using a Kullback-Liebler divergence technique.

7. The computer-implemented method of claim 1, wherein merging the particular ones of the sub-class context models to generate the hierarchical set of context models comprises:

adding the sub-class context models to the hierarchical set of context models;

repeatedly identifying and merging two or more context models that are determined to be similar to generate an intermediate context model, wherein the two or more context models are selected from a group consisting of the sub-class context models and other intermediate context models that have previously been generated by merging context models; and adding each instance of the intermediate context model that is generated to the hierarchical set of context models.

8. The computer-implemented method of claim 1, wherein selecting the particular ones of the context models from among the hierarchical set of context models comprises selecting multiple context models that are collectively trained based on substantially all of the text samples for which the sub-class context models were generated, wherein at least one of the multiple context models selected is an intermediate context model that was generated by merging two or more context models that were determined to be similar.

9. The computer-implemented method of claim 1, wherein the particular ones of the context models are selected so as to optimize one or more metrics.

10. The computer-implemented method of claim 9, wherein the particular ones of the context models are selected so as to optimize two or more metrics including: (i) minimizing a total number of context models selected to generate the class-based language model, and (ii) maximizing variation among the particular ones of the context models selected.

11. The computer-implemented method of claim 1, further comprising evaluating one or more performance metrics of the class-based language model using a first set of input data.

12. The computer-implemented method of claim 11, further comprising:

selecting second ones of the context models from among the hierarchical set of context models;

generating a second class-based language model based on the selected second ones of the context models, each of the second ones of the context models corresponding to a class in the second class-based language model;

evaluating the one or more performance metrics of the second class-based language model using the first set of input data; and determining whether the class-based language model or the second class-based language model is better based on the one or more performance metrics.

13. The computer-implemented method of claim 1, wherein the sub-class context models are generated by training the sub-class context models using text samples in which the respective class terms of the text samples are redacted and replaced with respective sub-class identifiers that correspond to the sub-classes of the respective groups to which the respective text samples are assigned.

14. The computer-implemented method of claim 1, comprising generating the sub-class context models based on training data that comprises truncated text samples that include only the n terms that immediately precede the respective class terms in the text samples through the n terms that immediately follow the respective class terms in the text samples.

15. The computer-implemented method of claim 14, wherein n equals one, two, or three.

16. The computer-implemented method of claim 1, wherein, for each respective group of text samples among the plurality of groups of text samples, the respective class terms of the text samples assigned to the respective group of text samples are substantially identical.

17. One or more non-transitory computer-readable media including instructions that, when executed by one or more processors, cause performance of operations, comprising:

obtaining, by a computing system, a plurality of text samples that each includes a respective class term that belongs to a same pre-defined class of topically related terms;

for each respective text sample among the plurality of text samples:

(i) identifying that the respective class term of the respective text sample belongs to a particular sub-class, among a plurality of sub-classes, of the pre-defined class of topically related terms; and (ii) assigning the respective text sample to a particular group of text samples that corresponds to the particular sub-class to which the respective class term of the respective text sample belongs, such that the plurality of text samples are assigned among a plurality of groups of text samples and each respective group of text samples among the plurality of groups of text samples corresponds to a different one of a plurality of sub-classes of the pre-defined class of topically related terms;

generating, by the computing system and for each respective sub-class among the plurality of sub-classes, a respective sub-class context model that represents probabilities of language sequences determined based on the text samples assigned to the corresponding group of text samples for the respective sub-class;

merging, by the computing system, particular ones of the sub-class context models that are determined to be similar to generate a hierarchical set of context models;

selecting, by the computing system, particular ones of the context models from among the hierarchical set of context models;

generating, by the computing system, a class-based language model that includes, for each of the selected context models, a respective class that corresponds to the respective context model; and providing the class-based language model in a speech recognition system and transcribing speech characterized in an audio signal to text using the class-based language model in the speech recognition system.

18. The one or more non-transitory computer-readable media of claim 17, wherein, for each respective group of text samples among the plurality of groups of text samples, the respective class terms of the text samples assigned to the respective group of text samples are substantially identical.

19. A system comprising:
one or more processors; and
one or more computer-readable media including instructions that, when executed by the one or more processors, cause performance of operations comprising:
obtaining, by the system, a plurality of text samples that each includes a respective class term that belongs to a same pre-defined class of topically related terms;
for each respective text sample among the plurality of text samples:
  (i) identifying that the respective class term of the respective text sample belongs to a particular sub-class, among a plurality of sub-classes, of the pre-defined class of topically related terms; and
  (ii) assigning the respective text sample to a particular group of text samples that corresponds to the particular sub-class to which the respective class term of the respective text sample belongs, such that the plurality of text samples are assigned among a plurality of groups of text samples and each respective group of text samples among the plurality of groups of text samples corresponds to a different one of a plurality of sub-classes of the pre-defined class of topically related terms;

generating, by the system and for each respective sub-class among the plurality of sub-classes, a respective sub-class context model that represents probabilities of language sequences determined based on the text samples assigned to the corresponding group of text samples for the respective sub-class;

merging, by the system, particular ones of the sub-class context models that are determined to be similar to generate a hierarchical set of context models;

selecting, by the system, particular ones of the context models from among the hierarchical set of context models;

generating, by the system, a class-based language model that includes, for each of the selected context models, a respective class that corresponds to the respective context model; and providing the class-based language model in a speech recognition system and transcribing speech characterized in an audio signal to text using the class-based language model in the speech recognition system.

* * * * *